United States Patent [19]

Pietro

[11] Patent Number: 4,770,434
[45] Date of Patent: Sep. 13, 1988

[54] VEHICLE CONSISTING OF TWO DISTINCT AND DETACHABLE SECTIONS

[76] Inventor: Zen Pietro, Via Monte Bianco 10/A, 35018 San Martino di Lupari (Padova), Italy

[21] Appl. No.: 31,466
[22] PCT Filed: Jul. 22, 1985
[86] PCT No.: PCT/IT86/00058
 § 371 Date: Feb. 18, 1987
 § 102(e) Date: Feb. 18, 1987
[87] PCT Pub. No.: WO87/00498
 PCT Pub. Date: Jan. 29, 1987

[30] Foreign Application Priority Data
 Jul. 24, 1985 [IT] Italy ................ 3512 A/85

[51] Int. Cl.⁴ .................. B62K 13/00; B62K 15/00
[52] U.S. Cl. ..................... 280/278; 280/287; 180/223; 403/374
[58] Field of Search ........... 180/223, 224; 280/287, 280/278, 289 R, 204; 403/323, 374, 379

[56] References Cited

U.S. PATENT DOCUMENTS

| | | | |
|---|---|---|---|
| 913,961 | 3/1909 | Levedahl | 280/276 |
| 3,001,599 | 9/1961 | Fryar | 180/219 |
| 3,292,947 | 12/1966 | Musichuk | 280/287 |
| 3,561,777 | 2/1971 | Geis | 280/7.12 |
| 3,680,879 | 8/1972 | Cogliano | 280/278 |
| 3,814,462 | 6/1974 | Kelly | 403/323 |
| 4,026,573 | 5/1977 | Richardson | 280/278 |
| 4,097,059 | 6/1978 | Springer | 280/204 |
| 4,203,612 | 5/1980 | Reikema | 280/278 |

FOREIGN PATENT DOCUMENTS

| | | | |
|---|---|---|---|
| 575113 | 5/1959 | Canada | 180/223 |
| 881010 | 6/1953 | Fed. Rep. of Germany | 180/223 |
| 2048343 | 4/1971 | Fed. Rep. of Germany | . |
| 558130 | 8/1923 | France | . |
| 57337 | 7/1944 | Netherlands | 280/278 |
| 2108622 | 5/1983 | United Kingdom | . |

*Primary Examiner*—John A. Pekar
*Attorney, Agent, or Firm*—Laff, Whitesel, Conte & Saret

[57] ABSTRACT

The vehicle disclosed offers significant economies from both manufacturer and user standpoints, by virtue of its being embodied in two distinct sections, front and rear, that are joined by way of a detachable coupling located between the swivel sleeve which carries the front fork and the frame which carries the rear wheel, or wheels; in a preferred embodiment, the detachable coupling is of a quick-release type.

6 Claims, 3 Drawing Sheets

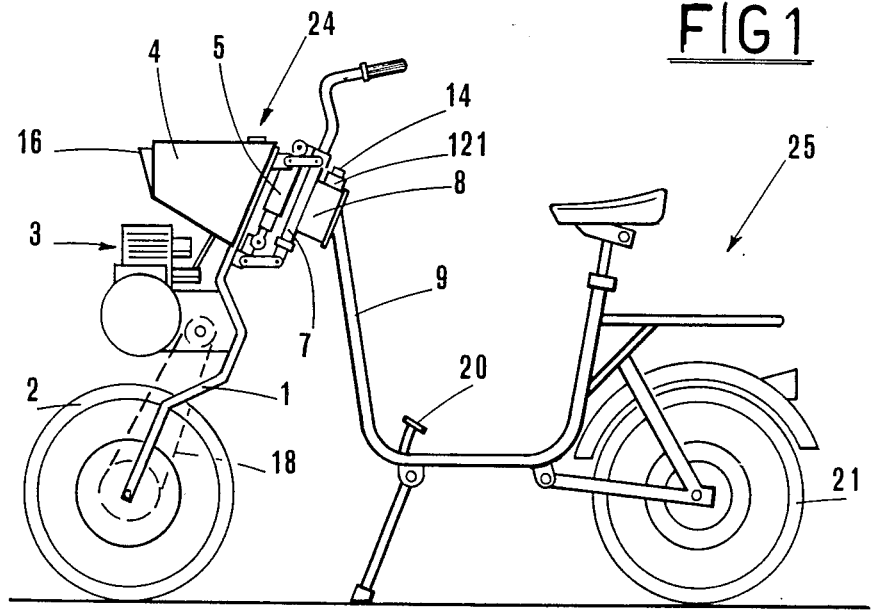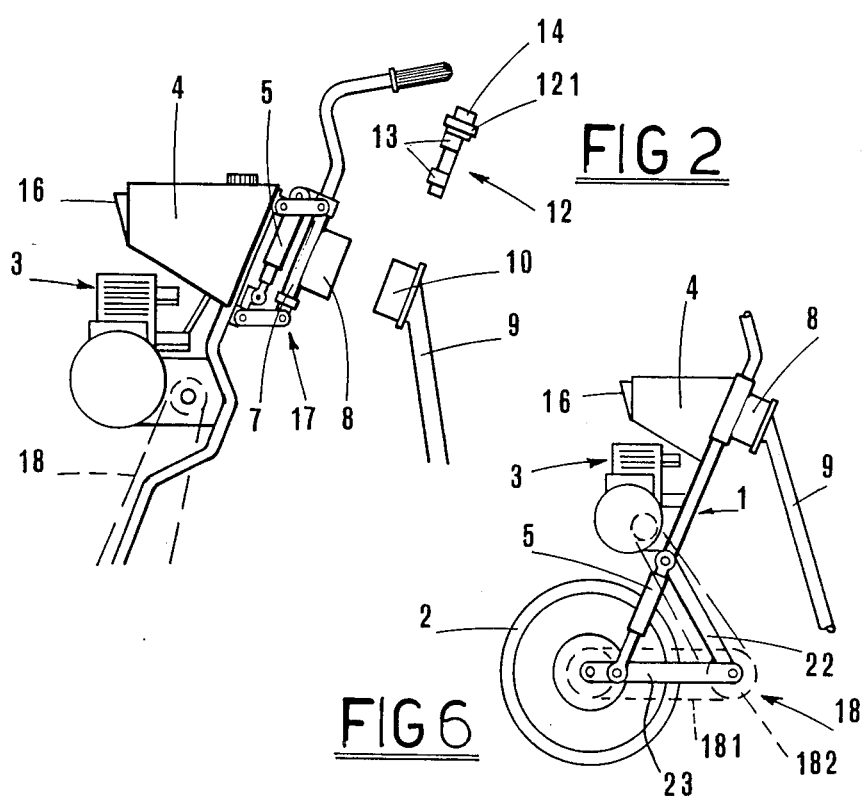

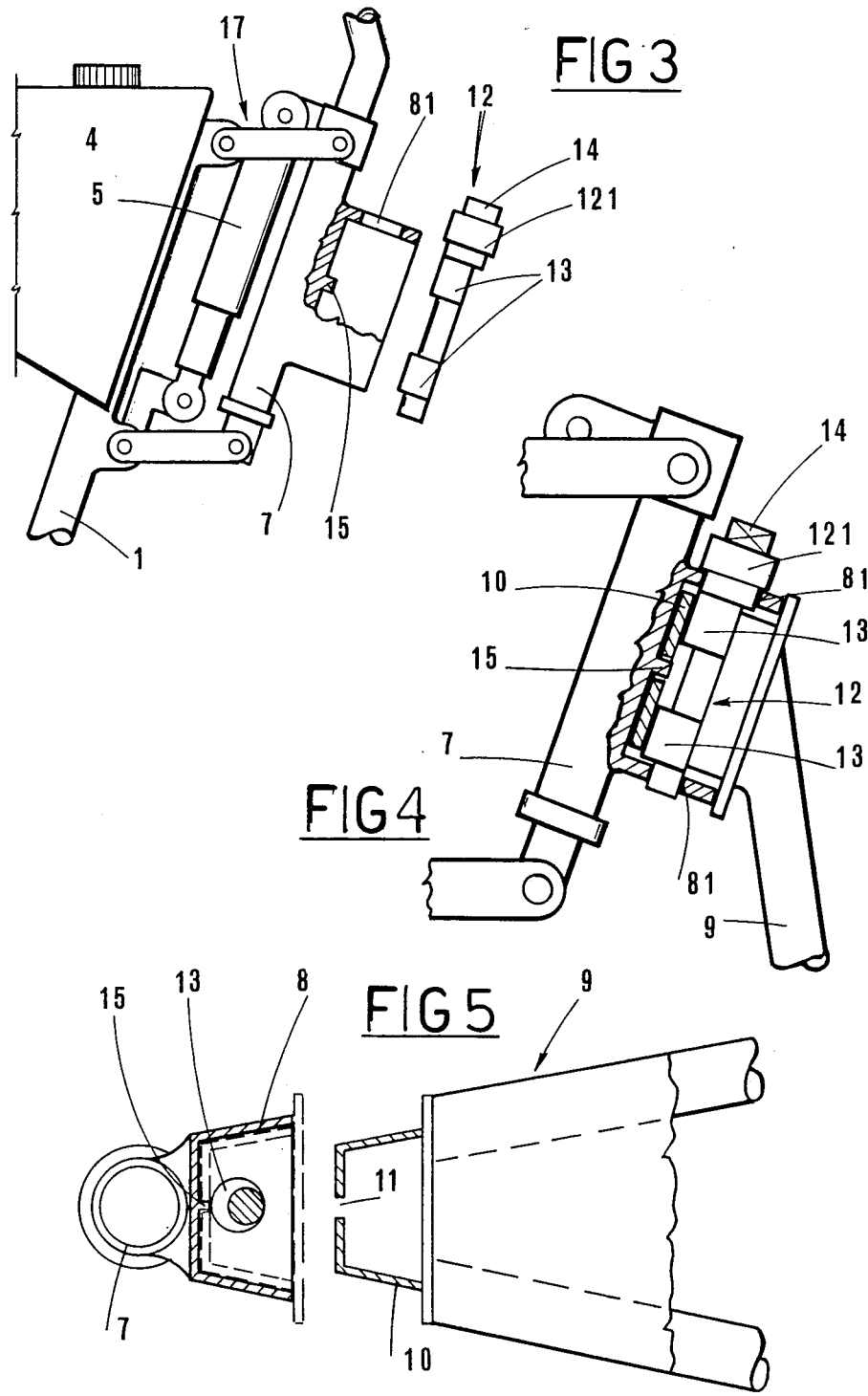

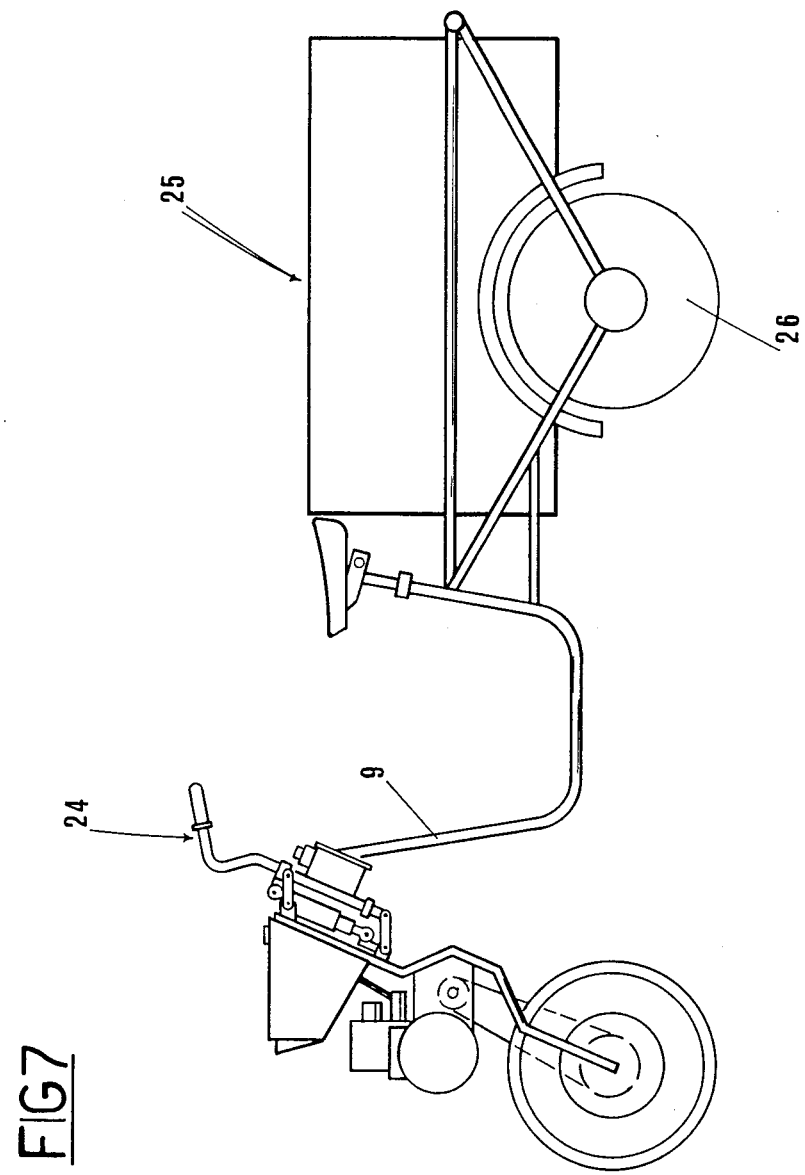

VEHICLE CONSISTING OF TWO DISTINCT AND DETACHABLE SECTIONS

BACKGROUND OF THE INVENTION

The invention described herein relates to a vehicle consisting of two distinct and detachable sections.

It is common practice in the art field of transportation vehicles, motor-driven or otherwise, to embody different vehicles utilizing as great a number of common parts as possible. Such is the case, for example, with lightweight two- or three-wheelers, all of which derive in practical terms from a basic design appropriately adapted to meet a variety of user requirements.

Different versions of such vehicles as currently embodied reflect numerous modifications of the basic design; such embodiments are costly, and admit of no subsequent adaptation. Accordingly, the object of the invention disclosed is to overcome this drawback.

SUMMARY OF THE INVENTION

The stated object is realized in a vehicle as described and claimed herein, which consists in two distinct and detachable sections embodied in such a way that no alteration need be made to the basic design in order to produce different versions for general sale; an essential advantage of such a vehicle is that a variation on the basic design can be obtained by replacing the basic rear section complete, with a further rear section, similarly complete, such as possesses requisite features other than those of the basic design.

The advantage of such a feature is that a manufacturer may hold a stock of front sections ready for assembly, already fitted with a drive unit perhaps, and embody the rear sections according to custom or general market requirements.

Similar advantage is brought to purchasers by the feature in question: where the requirement may exist for two or more single vehicles that can be utilized separately for different purposes, the individual may purchase one front section to serve all of the various single vehicles, or, if already in possession of a number of such single vehicles, interchange the front section of one with that cf another, according to requirements, without in any way compromising the vehicles' availability for service. Again, where the user may be in possession of a variety of vehicles according to the invention, e.g. fitted with different drive units, dissimilar front sections can be interchanged temporarily in given instances in order to meet the requirements of the moment.

The basic facility of embodying a vehicle consisting in two fully distinct sections that can be detached one from the other also permits of embodying rear sections in special designs—i.e. designs that might be of limited sales potential where manufactured as an integral part of a purpose-built vehicle. The rear section might be designed as a tandem, for example, or carriage style with paired wheels and two seats arranged side by side, or with a truck body, or even as a sled with skids.

The prior art embraces folding bicycles featuring a frame divided into two sections that connect one with the other by way of a hinge and clamp; the two sections of such a frame are not fully distinct however, and associate permanently with parts common to both, namely, the rear brake linkage and the tail light circuit. What is more, the hinge and clamp are required to form a rigid connection in conjunction with respective flat flanges, integral with either section, that are offered flush one to the other; prevention of mislaignment alignment between the two sections thus falls almost entirely to the hinge, which is of necessity located to one side of the two connected flages and cannot therefore offer a total guarantee of faultless mutual positioning between the two sections.

By contrast, the two sections of a vehicle according to the invention are totally distinct, and connected together by way of matched components that lock together in full-frontal fashion, thereby affording marked strength and rigidity and allowing the embodiment of a solid, yet remarkably compact structure.

BRIEF DESCRIPTION OF THE DRAWINGS

The invention will now be described in detail by way of example with reference to the accompanying drawings, in which:

FIG. 1 is the side elevation of a motor cycle embodied according to the invention;

FIGS. 2 and 3 are side elevations of a detachable coupling that connects the front and rear sections of the motor cycle in FIG. 1, seen in the dismantled state;

FIG. 4 is a side elevation off the detachable coupling in the motor cycle of FIG. 1, viewed in the assembled state with certain parts omitted and certain parts cut away better to reveal others;

FIG. 5 is a plan of the detachable coupling in the motor cycle of FIG. 1, seen in dismantled state with certain parts omitted and certain parts cut away better to reveal other;

FIG. 6 is the side elevation of a second embodiment of the front section of a motor cycle embodied according to the invention, in which certain parts are omitted;

FIG. 7 is the side elevation of a further embodiment of the vehicle according to the invention.

DESCRIPTION OF THE PREFERRED EMBODIMENT

A bicycle, or a motor cycle with front wheel drive, as illustrated in FIG. 1, consists of a frame 9 supporting the rear wheel 21, and a front fork 1 which supports the front wheel 2, hinged to the forward end of the frame 9 by way of a swivel sleeve 7 that ensheaths the top end, or shank, of the fork 1 itself.

The front fork 1 carries an engine 3, and a fuel tank 4 that may also incorporate a headlamp 16.

In a cycle according to the invention, the swivel sleeve 7 connects with the frame 9, of which it must become a part, by way of a detachable coupling 17. Thus, the front section 24 of the vehicle, consisting of front fork 1 and front wheel 2, plus engine 3 and fuel tank 4 where appropriate, remains distinct and independently embodied in relation to the rear section 25, which comprises the frame 9 with either one rear wheel 21 (as in FIG. 1) or a set of rear wheels 26 (as in FIG. 7) and constitutes a similarly distinct embodiment.

With such an arrangement, the front brake (not illustrated) and the control components for the engine 3 and headlamp 16 can be fitted exclusively to the front section, whereas those parts typical of the rear end of a cycle will be fitted exclusively to the rear section; for example, a pedal-operated rear brake 20 would be adopted.

The only component likely to be fitted to both sections of the motor cycle would be the tail light circuit; accordingly, this contingency is met either by incorporating a connector into the detachable coupling 17, by means of which to join up the two parts of the circuit, or by providing the rear section with an independent dynamo.

In a preferred embodiment, the detachable coupling 17 would be of a quick-release type as illustrated in the drawings, consisting of matching tapered elements 8 and 10 through which a hinge pin 12 can be inserted.

One such tapered element 8, integral with the swivel sleeve 7 (see FIGS. 3, 4 and 5), is box-constructed having side walls tapering towards a rear wall, and offers an open side to the matching tapered element 10 which has side walls diverging from a front wall, which in turn is integral with the frame 9; the element denoted 8 also exhibits two holes 81 located one in each of two of its opposite sides, centered on an axis parallel with that of the swivel sleeve 7, in which the hinge pin 12 is able to engage.

Viewed along the same axis (parallel with that of the swivel sleeve 7) the matching tapered element 10 exhibits a completely hollow profile, and is therefore able to accommodate the hinge pin 12 freely.

The sides of the matched elements 8 and 10 converge toward the swivel sleeve 7, thus exhibiting a tapered profile when viewed in plan (FIG. 5).

15 denotes a reference pin issuing from the inside face or rear wall of the one tapered element 8 offered to the matching tapered element 10, which locates in a corresponding socket 11 offered in similar fashion by the front wall of the matching tapered element 10.

The hinge pin 12 incorporates a pair of cams 13 located one above the other and designed to engage with the inside surface of the hollow tapered element 10 at either side of the reference pin 15. The top end of the hinge pin 12 is provided with a purchase 14 in the form of a square end, or a lever (not illustrated), and, between the purchase 14 and the uppermost of the two cams 13, with a boss 121 of diameter greater than that of the top hole 81 in the tapered element 8 of the front fork, which prevents the pin itself from dropping through the holes 81.

It will be observed, from FIGS. 1, 2 and 3 in particular, that the front fork 1 connects with the swivel sleeve 7 by way of a linkage embodied as an articulated parallelogram 19 two points of which, disposed substantially opposite from one another, are connected to a strut 5 providing the suspension for the front section 24 of the motor cycle.

Transmission of drive from the engine 3 to the front wheel 2 might be effected by any given method; the arrangement of FIG. 1, for example, makes use of a chain or belt 18.

FIG. 6 shows an alternative embodiment of the front section of a cycle embodied according to the invention. In this instance, the articulated parallelogram is dispensed with, and suspension is achieved by splitting the front fork 1 into two components 22 and 23 hinged to each other at one end and interconnected by the strut 5 at intermediate points along their length. Drive will be transmitted in such an embodiment not by a single chain, or belt 18, but by a pair of chains or belts 181 and 182 looped around a double sprocket or pulley coaxial with the pivot of the two components 22 and 23 that make up the front fork 1.

Assembly of a vehicle according to the invention is achieved quickly and with ease simply by locating the one tapered element 10 into the other 8, slotting the hinge pin 12 through the holes 81 of the outer element 8, and then turning on the purchase 14. Once the hinge pin 12 cannot be turned further, the matching surfaces of the two tapered elements 8 and 10 will be urged into close contact, with the reference pin 15 of the one element 8 located firmly in the corresponding socket 11 of the other element 10.

The vehicle is illustrated in FIG. 1 as an ordinary motor cycle, though the embodiment could equally well be that of a pedal bicycle, or a motor-driven or pedal tandem, depending on the type of front section fitted.

In the example illustrated in FIG. 7, the frame 9 incorporates a pick-up truck body with two coaxially disposed rear wheels 26; the ultimate embodiment could of course be entirely different, perhaps designed to carry an item of equipment such as a cultivator or a power saw, or even constructed as a sled fitted with skids.

What is claimed:

1. A vehicle having a front fork with a swivel sleeve means, a frame carrying a rear wheel or wheels, a coupling means releasably connecting said swivel sleeve to said frame and said coupling comprising quick-release means, said quick release means comprising two matched tapered elements having matched tapered side walls, one of the tapered element extending from said swivel sleeve and the other tapered element extending from said from, said tapered elements being matched to permit the two tapered elements to freely slide one in and out of the other in the absence of a hinge pin, a first tapered element having a front wall and a second tapered element having a rear wall, a hinge pin, said hinge pin having at least one cam thereon, means provided by said tapered elements to accommodate said hinge pin, said hinge pin being sized and positioned relative to said first and second tapered elements wherein turning the hinge pin causes the cam in one position to bring the front wall of the first tapered element in tight contact with the rear wall of the second tapered element and in another position to loosely connect the tapered elements and to permit the tapered elements to be detached from each other.

2. A vehicle as in claim 1, wherein the hinge pin is disposed perpendicular to a right plane of convergence of the matched tapered elements.

3. A vehicle as in claim 1, wherein a reference pin issuing from one tapered element is offered to a corresponding socket located in the matching tapered element.

4. A vehicle as in claim 3 wherein the tapered element incorporating the reference pin is integral with the swivel sleeve and box-constructed such as to offer an open side to the frame for accommodation of the matching tapered element, and wherein the matching tapered element, which incorporates the socket, is integral with the frame and exhibits substantially hollow profile when viewed along the axis parallel to the swivel sleeve.

5. The vehicle of claim 1 wherein the first tapered element extends from said frame and is sized such that it slides into the second tapered element and when said front wall contacts said rear wall, side walls of both tapered elements are in contact with others.

6. The vehicle of claim 5 wherein second tapered element extending from the sleeve has a top wall and bottom wall, said top wall defining a hole sufficiently large to permit the cam of the hinge pin to pass therethrough, said bottom wall having means to rotatably hold the hinge pin in its desired alignment when the hinge pin is placed in its desired position, said hinge pin being disposed perpendicular to a right plane of convergence of the matched tapered elements, a reference pin and a corresponding socket being located on said dfront and rear walls to properly align the two tapered elements, and wherein the second tapered element extending from the swivel sleeve is box-constructed with an open side facing the frame.

* * * * *